May 23, 1950     J. E. CONZELMAN, JR., ET AL     2,508,496
INSIDE DIAMETER COMPARATOR
Filed Sept. 18, 1945
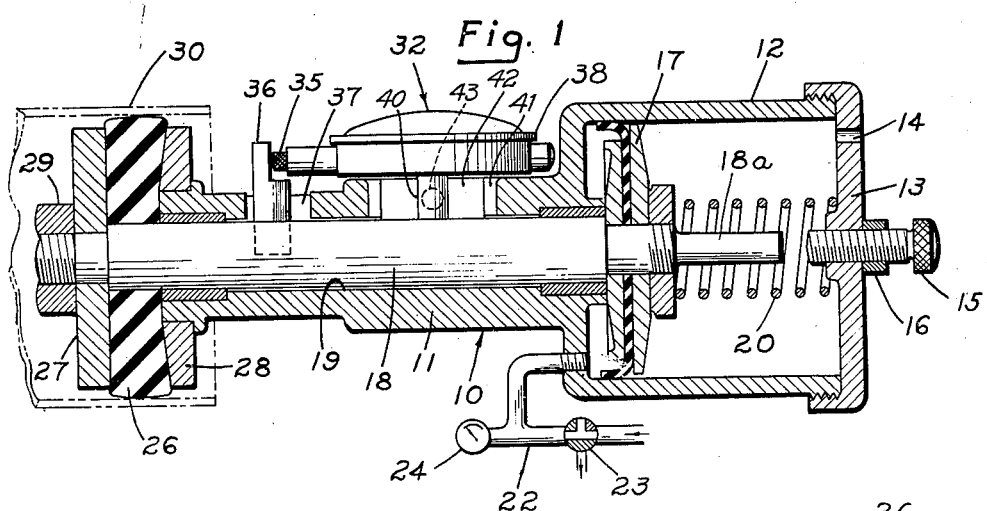
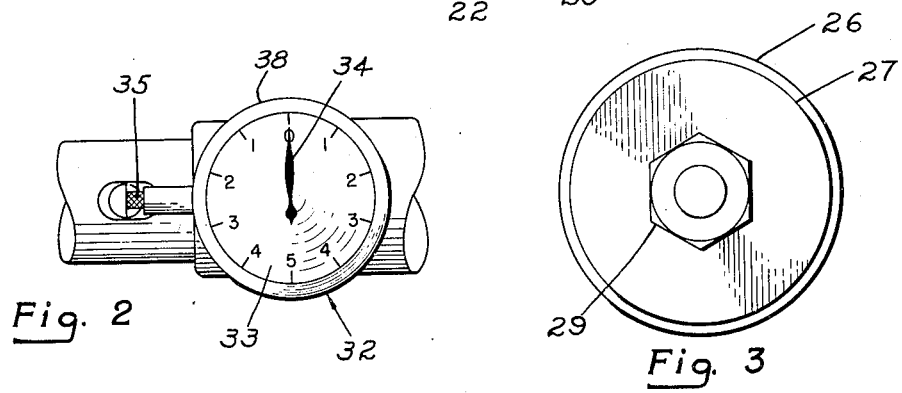
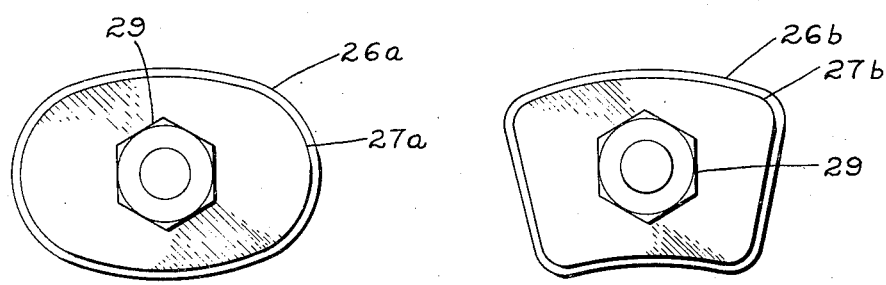
INVENTORS
JOHN E. CONZELMAN JR.
HAROLD D. EGGLESTON
BY
*E.␣␣Woodbury*
ATTORNEY Patented May 23, 1950

2,508,496

UNITED STATES PATENT OFFICE 2,508,496

INSIDE DIAMETER COMPARATOR

John E. Conzelman, Jr., Sierra Madre, and Harold D. Eggleston, La Mesa, Calif., assignors to Solar Aircraft Company, San Diego, Calif., a corporation of California Application September 18, 1945, Serial No. 617,014

4 Claims. (Cl. 33—178)

This invention relates to gauges for indicating the inside dimensions of hollow objects, such as tubular members, and is particularly useful for gauging thin-walled, tubular members where the inside peripheral length is to be gauged rather than any exact radial dimension.

An object of the invention is to provide a gauge that can be rapidly manipulated for measuring inside dimensions of hollow objects.

Another object is to provide a gauge that is very simple to use and does not require the exercise of special skill in order to give accurate readings.

Another object is to provide a gauge that accurately indicates inside peripheral lengths despite slight departures of the gauged members from their normal or intended cross-sectional shapes.

Another object is to provide a gauge capable of quickly indicating predetermined departures from predetermined shape of hollow objects, and also indicating the inside peripheral length of the object in a single operation.

Another object is to provide an inside gauge that is readily adaptable to measure the interior peripheral lengths of tubular objects of different cross-sectional shapes.

Other more specific objects and features of the invention will appear from the detailed description to follow, of a specific embodiment of the invention.

The invention includes an expansible member consisting of a relatively thick sheet or pad of some solid elastic material, such as rubber, which sheet is of slightly smaller dimensions than the hollow body to be gauged, and is mounted between two plates so that it can be compressed in the direction of its thickness. In use, the rubber pad or sheet is introduced into the hollow body to be gauged, and is then compressed in the direction of its thickness. This causes the rubber sheet to expand laterally against the interior surface of the hollow body, which then limits further lateral expansion, and likewise limits further compression in the direction of the thickness of the sheet. A gauge is connected to the two compression plates to indicate the extent to which they are moved together, thereby giving an indication of the interior dimension of the hollow body. Various methods can be employed for applying the force necessary to distort the rubber sheet, though we find it convenient in practice, to produce the movement by air pressure applied to a cylinder or bellows. By applying air from a source of constant pressure to the cylinder, a uniform compressive force can be repeatedly and rapidly applied to the rubber sheet, causing it to be expanded laterally with equal force during a series of gauging operations.

A full understanding of the invention may be had from the following detailed description referring to the drawings, in which:

Fig. 1 is a longitudinal section through a gauge in accordance with the invention, with the gauging head positioned within a tube to be gauged, the dial indicator being shown in the elevation;

Fig. 2 is a detail plan view of the mid portion of the gauge shown in Fig. 1; and Figs. 3, 4 and 5 are end views of three different gauging heads of different shapes, that can be employed with the gauge.

Referring first to Fig. 1, our device comprises a body 10 consisting of a mid portion 11 of relatively small exterior diameter, which merges at its right end into a cylinder 12 of substantially larger diameter. The cylinder 12 is closed at its outer end by a cap 13 having a vent hole 14 and a stop screw 15, which is threaded into the cap and adapted to be locked in a desired position of adjustment with a lock nut 16. The cylinder 12 contains a piston 17 of conventional construction, which is secured to a shaft 18 which projects through a hole 19, which extends longitudinally through the mid portion 11 of the body member 10. A helical compression spring 20 normally maintains the piston 17 in the left end of the cylinder 12, as shown, but the piston can be moved to the right by the admission of compressed air into the left end of cylinder 12 through a line 22 from any suitable air source under the control of a valve 23. A pressure gauge 24 is connected to the line 22 so that a desired pressure can be repeatedly developed in the cylinder 12.

The gauging head of the instrument is at the left end of the body member 10, and comprises a compressible member 26 of some yieldable material, such as rubber, which is positioned between and adapted to be compressed longitudinally by two pressure plates 27 and 28, respectively. The pressure plate 28 is mounted on and supported by the left end of the body member 10, whereas the pressure plate 27 is mounted on the left end of the shaft 18 as by a nut 29, so that when the shaft 18 is moved to the right by air pressure in the left end of the cylinder 12, the member 26 is compressed longitudinally between the members 27 and 28, and this longitudinal compression distorts the member 26, causing it to expand radially against the interior surface of an object to be gauged. In Fig. 1, such an object is indicated as a piece of tubing 30 of circular cross-section. Under such conditions the member 26 would also be of circular cross-section, but of slightly smaller diameter than the inside diameter of the tubing 30. The plates 27 and 28 would also be of circular shape and slightly smaller in diameter than the member 26.

In operation, as will be described later, the shaft 18 moves to an extent determined by the size of the article or object being gauged, and the movement of the shaft 18 is caused to actuate any suitable type of indicating mechanism 32. As shown in Figs. 1 and 2, the indicator 32 is a well known type of instrument comprising a casing having a dial 33 and a hand 34, which hand is coupled by any suitable motion-multiplying mechanism to a rod 35 which extends from the casing. As clearly shown in Fig. 1, the device 32 is anchored to the mid portion 11 of the body 10 by means of a stud 40 projecting from the lower side thereof, which is clamped in a slot 41 in the member 11, by a plate 42, which is urged against the stud 40 by a set screw 43 threaded through the member 11, and the actuating rod 35 is adapted to be contacted by a projection 36 on the shaft 18, which projects through an elongated aperture 37 in the body 10. When the rod 35 is held in a predetermined position by the projection 36, the hand 34 occupies a predetermined zero position on the dial 33. On the other hand, if the projection 36 is displaced from the predetermined position, the hand 34 is moved away from the zero point in one direction or the other, to indicate the extent of the displacement.

The tool is most useful for rapidly determining whether a series of objects to be gauged vary from a desired size. To this end, the device may be first calibrated by positioning the member 26 within a piece of tubing 30 of known size, and applying a predetermined air pressure to the left end of the cylinder 12 by means of the valve 23. The movement of shaft 18 to the right in response to the force developed by the pressure air against the left side of the piston 17, compresses the member 26 between the plates 27 and 28, causing it to expand radially into contact with the tubing 30. The extent to which the plates 27 and 28 compress the member 26, is limited by the resistance to compression of the member 26 as it contacts the tubing 30. While the pressure is maintained in the cylinder, the instrument 32 is set to the zero position by rotating the dial 33, which is connected to the exposed rim 38, until the zero point on the dial is opposite the hand 34.

Thereafter, pressure in the cylinder 12 is released by means of the valve 23, whereupon shaft 18 is retracted by the spring 20 and by the restoring force of the member 26, so that it contracts radially away from the tubing 30 and can readily be withdrawn and re-inserted in a tube of unknown size to be gauged.

If the tubes to be gauged are of the proper size, the member 26 will be compressed to the same extent between the plates 27 and 28, and the hand 34 of the instrument 32 will come to rest on the zero point when the same air pressure is applied to the cylinder 12 as was applied during the calibration operation. On the other hand, if the tube being tested varies in its peripheral size from the desired dimensions, the plate members 27 and 28 will be moved toward each other a lesser or a greater extent, and the variation will be indicated as a plus or minus variation by the hand 34.

If the tubing being gauged is relatively thin-walled, it will be readily distortable, and even though it is not initially of true circular cross-section, it will be distorted into true circular cross-section by the expansive force of the member 26, and its inside peripheral length will be correctly indicated by the gauge.

Frequently, however, it is desired to test the tubing being gauged by abnormal departures from true circular shape, and such departures can be gauged by suitably choosing the diameters of the pressure plates 27 and 28 so that they will enter a tube that departs from true circular shape by a permissible amount, but will not enter a tube that is distorted beyond the permissible limits.

The gauge is readily adaptable for gauging tubes or other hollow objects of other than circular cross-section, by simply making the compressible member 26 and the plates 27 and 28 of shape corresponding to the objects to be gauged. Thus, as shown in Fig. 4, the plate 27a and member 26a may be of elliptical shape for gauging objects of elliptical shape. Fig. 5 shows another example of irregular shapes that may be used on plate 27b and the compressible member 26b for gauging an object of corresponding shape.

It has been previously mentioned that the cylinder cap 13 is provided with a stop screw 15. The purpose of this screw is to limit the extent of movement of the piston 17 should working or line pressure be admitted to the left end of the cylinder when the compressible member 26 is not positioned within a tube to be gauged. The inner end of the screw 15 limits movement of the piston 17 to safe value by abutting against an extension 18a on the right end of the shaft 18. At the time the gauge is calibrated for use with objects of predetermined approximate size, the stop screw 15 is adjusted to prevent lateral expansion of the compressible member 26, in excess of the limit of movement of the instrument 32.

Although for the purpose of explaining the invention, certain specific embodiments thereof have been disclosed and described, various departures can be made without departing from the invention which is to be limited only to the extent set forth in the appended claims.

We claim:

1. A gauge for gauging the inside dimension of a hollow object comprising: a member having a continuous peripheral surface expansible outwardly in all directions perpendicular to said surface in response to compression of said member in a second direction parallel to said surface, said peripheral surface being exposed for directly contacting the inner surface of the hollow object to be gauged and so dimensioned as to freely enter into the object to be gauged; means bearing against and movable relative to said member to compress said member in said second direction sufficiently to distort it and expand its said peripheral surface into contact with said object to be gauged; and means connected with said movable means for directly indicating the extent of movement of said movable means.

2. A gauge as described in claim 1 in which said member comprises a substantially homogeneous body of solid elastic material.

3. A gauge for gauging the inside dimension of a peripherally continuous hollow object comprising: a member of rubber-like material having a pair of approximately parallel end surfaces interconnected by a peripheral surface of substantially the same shape as but slightly smaller than the inside peripheral surface of the object to be gauged, and capable of expanding its peripheral surface in response to compression of said end surfaces toward each other; means including a pair of rigid end plates of substantially the same size and shape as said end surfaces for compressing said end surfaces toward each other with a predetermined force said member being readily distortable under said force, whereby the extent of movement of said end surfaces depends substantially upon the resistance to expansion of said peripheral surface; and means for indicating the extent of relative movement of said end surfaces.

4. A gauge as described in claim 3 in which the means for compressing said end surfaces toward each other comprises, a cylinder having a piston therein, means connecting said cylinder to one of said plate elements and means connecting said piston to the other plate element, and means for admitting pressure fluid to said cylinder, to move said piston relative to said cylinder.

JOHN E. CONZELMAN, Jr.
HAROLD D. EGGLESTON.

REFERENCES CITED

The following references are of record in the file of this patent:

UNITED STATES PATENTS

| Number | Name | Date |
|---|---|---|
| 1,145,924 | Russell | July 13, 1915 |
| 1,676,248 | Bryant | July 10, 1928 |
| 1,708,354 | Cabot | Apr. 9, 1929 |
| 1,994,388 | Erichsen | Mar. 12, 1935 |
| 2,030,244 | Cox | Feb. 11, 1936 |
| 2,150,070 | Kregecz | Mar. 7, 1939 |
| 2,267,110 | Kinley et al. | Dec. 23, 1941 |
| 2,348,643 | Poole | May 9, 1944 |